(12) United States Patent
Witt

(10) Patent No.: US 7,131,657 B1
(45) Date of Patent: Nov. 7, 2006

(54) BICYCLE TRAILER HITCH

(75) Inventor: Brian G. Witt, Winon Lake, IN (US)

(73) Assignee: ZZ Bike, LLC, Fort Wayne, IN (US)

( * ) Notice: Subject to any disclaimer, the term of this patent is extended or adjusted under 35 U.S.C. 154(b) by 0 days.

(21) Appl. No.: 10/900,411

(22) Filed: Jul. 27, 2004

(51) Int. Cl.
*B62K 27/00* (2006.01)

(52) U.S. Cl. ..................... 280/292; 280/204

(58) Field of Classification Search ............... 280/202, 280/204, 288.4, 292
See application file for complete search history.

(56) References Cited

U.S. PATENT DOCUMENTS

| | | | | |
|---|---|---|---|---|
| 4,511,155 A | * | 4/1985 | Galloway | 280/204 |
| 6,099,008 A | * | 8/2000 | Caffey | 280/204 |
| 6,305,703 B1 | * | 10/2001 | Quick et al. | 280/204 |
| 6,431,570 B1 | * | 8/2002 | Lennon et al. | 280/204 |
| 6,663,126 B1 | * | 12/2003 | Britton et al. | 280/204 |

* cited by examiner

*Primary Examiner*—Lesley D. Morris
*Assistant Examiner*—L. Lum
(74) *Attorney, Agent, or Firm*—Botkin & Hall, LLP

(57) ABSTRACT

This is a hitch for a connection between a bicycle and a trailer. The hitch includes a connector which is secured to the axle of the rear wheel of the bicycle. A joint extends between the connector and a rotatable tube. The rotatable tube is connected to the tongue of the trailer so as to form the hitch having three axes of pivot.

5 Claims, 3 Drawing Sheets

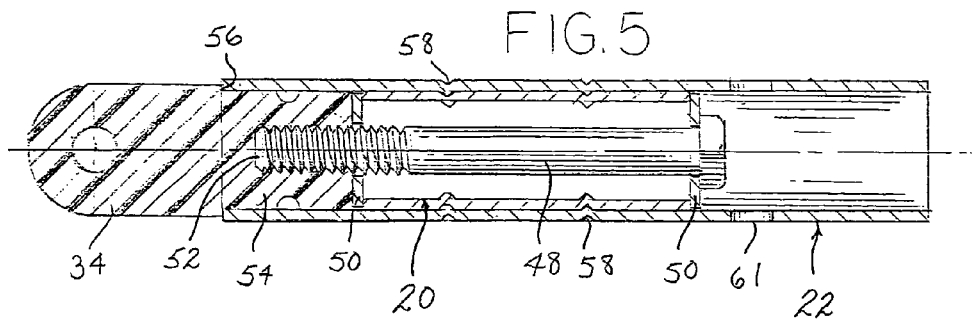
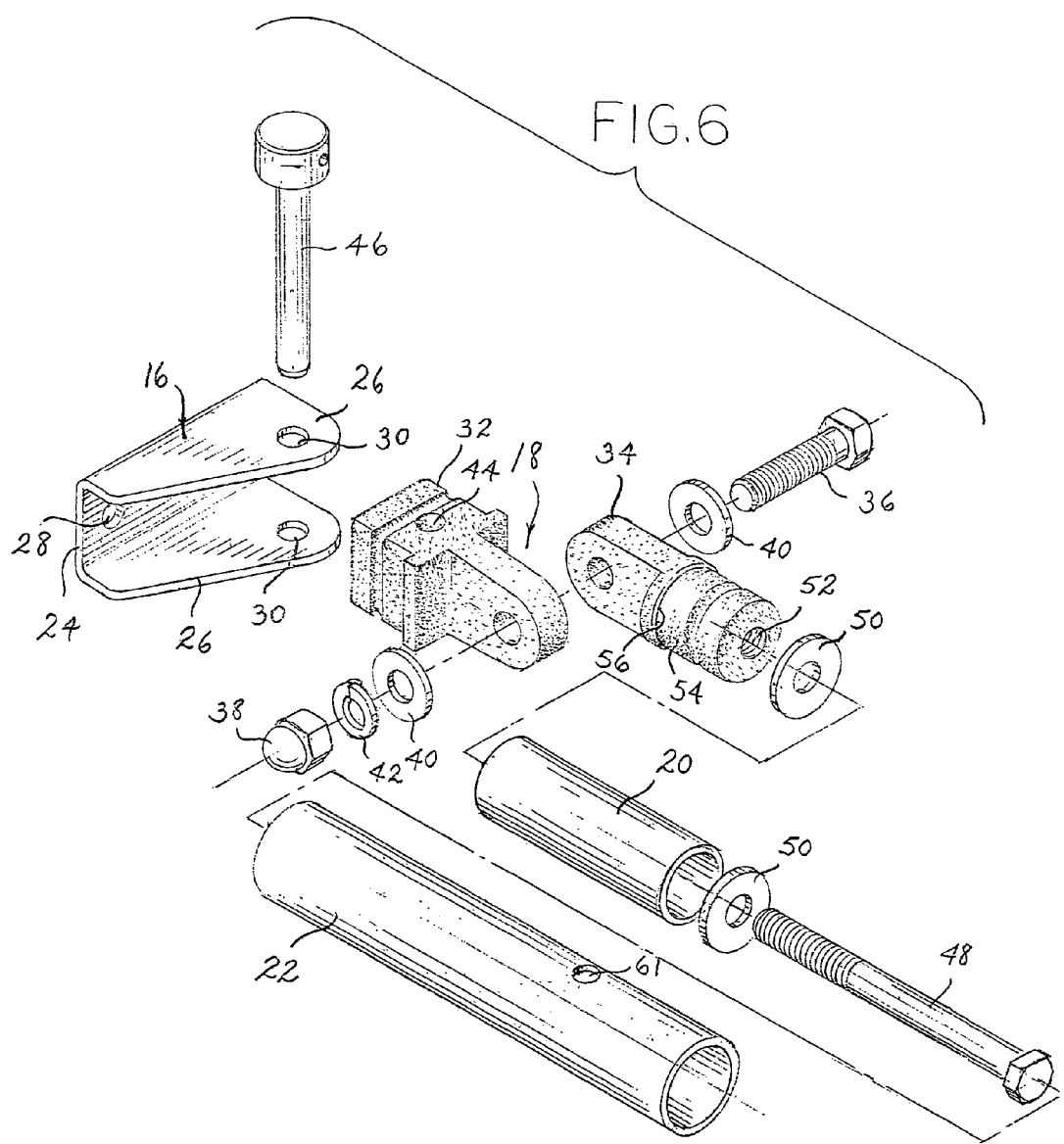

BICYCLE TRAILER HITCH

SUMMARY OF THE INVENTION

This invention relates to a hitch and will have specific application to a hitch used to connect a trailer or similar device to a bicycle.

The hitch of this invention is pivotal about three axes of rotation and includes a connector which is secured to a bicycle frame about its rear wheel axle. A joint part is pivotally connected between the connector and a rotatable tubular member. As such, the connection of the joint to the connector forms one pivot axis, the pivot joint itself forms a second pivot axis, and the connection of the rotatable tube to the joint part forms the third pivot axis of the hitch. The tongue of the trailer is connected to the rotatable tube.

Accordingly, it is an object of this invention to provide a bicycle trailer hitch which is of reliable construction and simple installation.

Still another object of this invention is to provide a bicycle trailer hitch which offers three axes of rotation between the bicycle and the trailer.

Other objects of this invention will become apparent upon the reading of the following description.

BRIEF DESCRIPTION OF THE DRAWINGS

FIG. 5 is a partial sectional view as seen along line 5—5 of FIG. 3.

FIG. 6 is a perspective view of the hitch with its component parts in separated form.

DESCRIPTION OF THE PREFERRED EMBODIMENT

Figure 1:
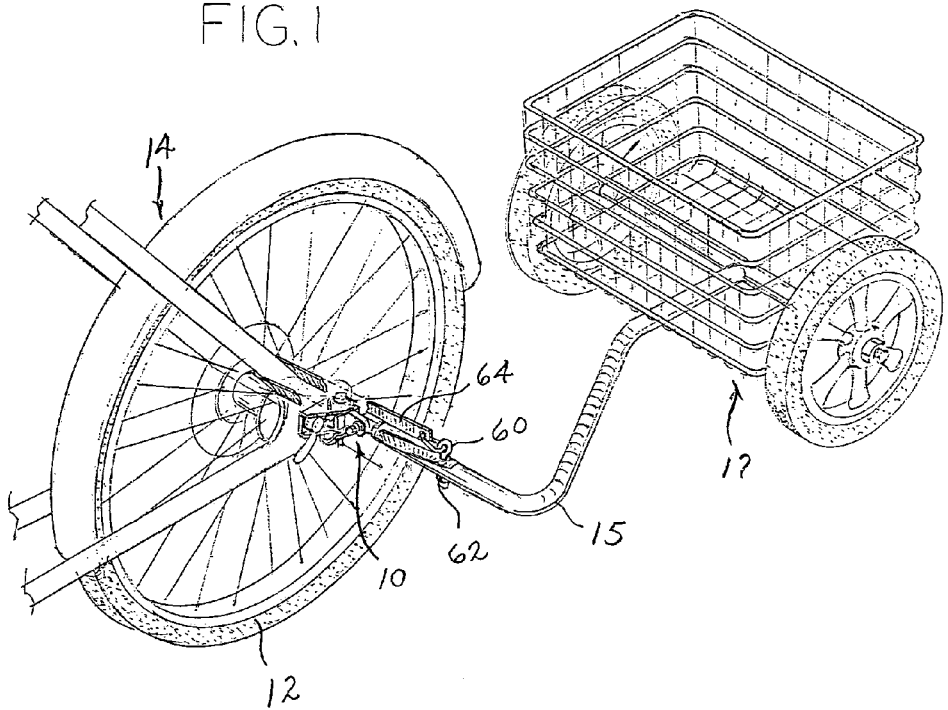
FIG. 1 is a perspective view of the hitch connected between a bicycle and a trailer.
Figure 2:
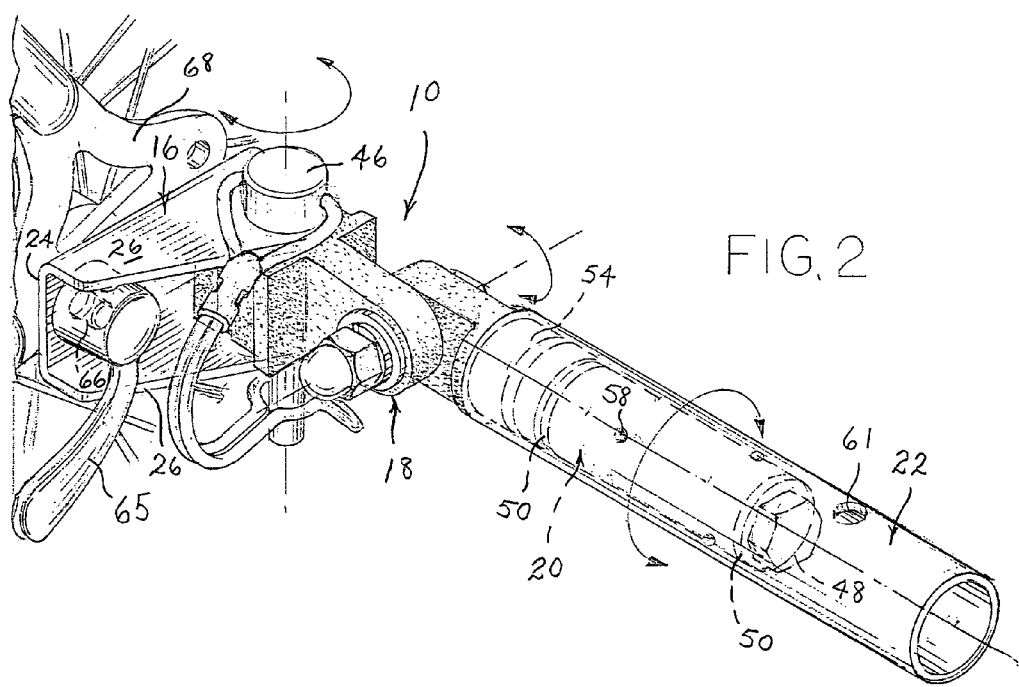
FIG. 2 is a perspective view of the hitch.
Figure 3:
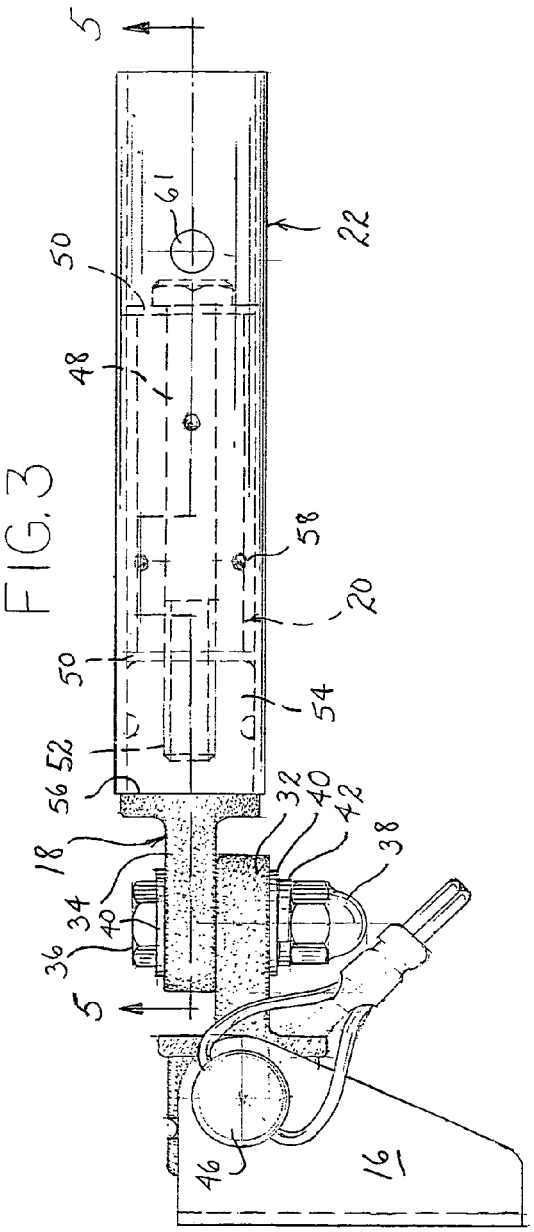
FIG. 3 is a side view of the hitch.
Figure 4:
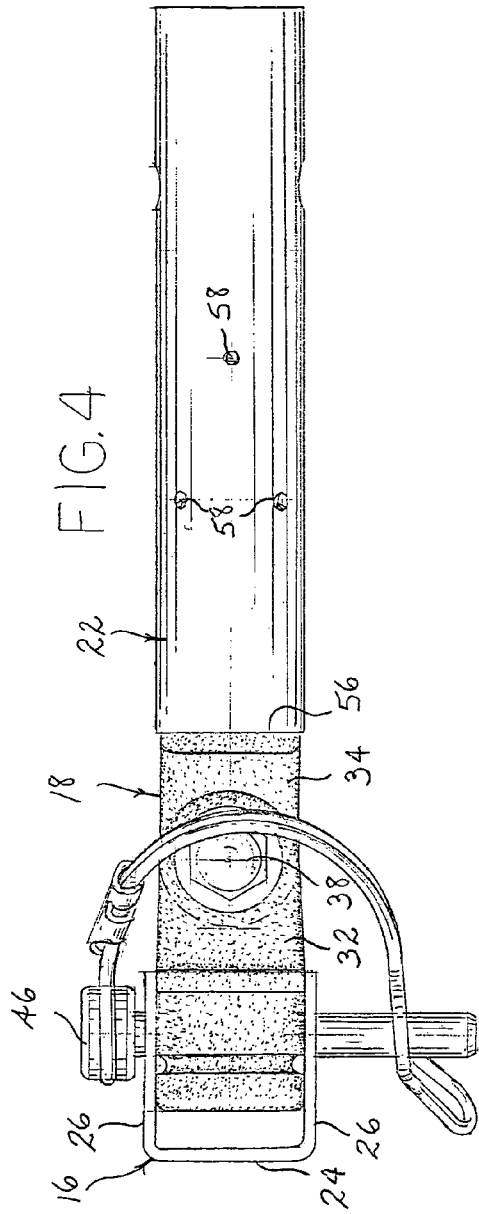
FIG. 4 is a top view of the hitch.

Hitch 10 of this invention is adapted for connection between rear wheel 12 of bicycle 14 and tongue 15 of a trailer 17 or similar pulled vehicle.

Hitch 10 includes a connector 16 which is U-shaped, a joint part 18, and an inner-tube 20 and an outer tube 22. Connector 16 includes a web 24 and a pair of spaced flanges 26 which extend outwardly from the web. Connector web 24 includes an opening 28 near one end and a pair of aligned openings 30 in its flanges 26 at its opposite end. Joint part 18 includes a first link 32 and second link 34 which are pivotally connected together by bolt 36 and nut 38 which secure the links together between a pair of washers 40 and a lock washer 42. The free end of first link 32 includes a bore 44 which is alignable with openings 30 in flanges 26 of connector 16. With first link 32 inserted between flanges 26, bore 44 is aligned with openings 30 and a removable lock pin 46 inserted through the aligned holes to secure the joint part 18 to the connector 16.

Inner tube 20 is secured to second link 34 of the joint part by having a bolt 48 inserted through the inner tube with a washer 50 extending about the bolt and overlying each end of the inner tube. Bolt 48 is turned into a concentrically located bore 52 formed in the end face of the second link 34 securing the bolt to the link part with the inner tube 20 carried upon the bolt. Inner tube 20 is snugly carried between washers 50 with the inner-most washer butting the end face of second link 34, yet is rotatable about the bolt relative to the washers. To prevent bolt 48 from loosening within second link 34 a bonding agent such as an epoxy glue can be placed within bore 52 in the second link 34 as the bolt is turned and threaded into the bore.

With inner tube 20 secured between washers 50 upon bolt 48 which is turned into second link part 34, outer tube 22 is slid or placed over inner tube 20 and neck 54 of second link 34, being brought to bear against shoulder 56 of the link. In this position, outer tube 22 extends beyond the head of bolt 36 with washers 40 fitting with slight clearance within the interior of the outer tube 22. The diametrical dimension of each of the washers 40 exceeds the outer diameter of inner tube 20 and is slightly less in diametrical dimension than the internal diameter of outer tube 22. Outer tube 22 is secured to inner tube 20 such as by crimping at locations 58. In this manner, as outer tube 22 rotates relative to joint part 18, inner tube 20 rotates about bolt 48 and either about washers 40 or with the washers as the washers rotate about the bolt. In either case, the washers act as bearing surfaces for the outer tube.

Hitch 10 is attached between bicycle 14 and tongue 15 of the trailer by having the tongue inserted over outer tube 22 and secured to the outer tube by a cross bolt 60 which extends through aligned holes 61 in the tongue and the outer tube, located outwardly from inner tube 20. Bolt 60 is secured by an appropriate nut and washer combination 62 and secures one end of a strap 64 which can be wrapped about a bicycle frame member and clipped at its other end to the eyelet of bolt 60 as a safety feature. Connector 16 is secured to bicycle 14 by first removing the skewer 65 connected to the rear axle of the rear wheel 12 of the bicycle. Connector 16 at its web 24 is placed over the protruding end 66 of the exposed axle at its opening 28 and the skewer then replaced upon the axle and locked into position thus clamping the connector over the axle between the skewer and the bicycle frame 68. Once the connector 16 has been secured to bicycle 14, first link 32 of the joint part 18 of the hitch is located between flanges 26 of the connector and lock pin 46 inserted downwardly through the aligned openings 30 in the flanges and opening 44 in the first link of the joint part. Lock pin 46 is then secured in position. Hitch 10 now having been secured between bicycle 14 and tongue 15 of the accompanying trailer, the trailer tongue can experience three axes of movement relative to the bicycle, the first axis of movement is about a vertical axis formed by lock pin 46 as it extends through the first link 32 and connector 16, the second axis of movement is the horizontal axis created by bolt 36 connecting the first and second links of the joint part, and the third axis of movement which is a horizontal axis at a general right angle to the second rotative axis caused by the rotation of the outer tube 22 and inner tube 20 about bolt 36 which is connected and secured to the second link of the joint part.

The above described invention is not to be limited to the details above given but may be modified within the scope of the appended claims.

I claim:

1. A hitch for connection between a bicycle having a wheel rotatable about an axle supported by a frame and a pulled vehicle having a tongue, said hitch comprising a connector for securing to said axle a joint part having a first link and a second link pivotally connected together about a first axis, said first link pivotally connected to said connector for rotation about a second axis, a first tube part pivotally associated with said second link for rotation about a third axis, said first tube part adapted to be connected to said tongue.

2. The hitch of claim 1 and a second tube part connected to said second link for rotation relative to said second link about said third axis, said first tube part fitted over and connected to said second tube part.

3. The hitch of claim 2 and a bolt extending through said second tube part along said third axis and turned into said second link to rotatively connect the second tube part to said second link.

4. The hitch of claim 3 and a washer trained upon said bolt at each end of said second tube part overlying said second tube part, said first tube part fitted over said washers.

5. The hitch of claim 4 wherein said second link includes a neck, said first tube part fitted over said neck and being rotatable relative to the neck and said bolt.

* * * * *